US 11,454,424 B2

(12) United States Patent
Colson et al.

(10) Patent No.: US 11,454,424 B2
(45) Date of Patent: Sep. 27, 2022

(54) AIR CYCLE MACHINES AND METHODS OF COMMUNICATING FLUID THROUGH AIR CYCLE MACHINES

(71) Applicant: Hamilton Sundstrand Corporation, Charlotte, NC (US)

(72) Inventors: Darryl A. Colson, West Suffield, CT (US); Roberto J. Perez, Windsor, CT (US); Beakal T. Woldemariam, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 280 days.

(21) Appl. No.: 16/809,979

(22) Filed: Mar. 5, 2020

(65) Prior Publication Data

US 2021/0278107 A1 Sep. 9, 2021

(51) Int. Cl.
  F25B 9/00 (2006.01)
  B64D 13/06 (2006.01)
  F25B 9/06 (2006.01)

(52) U.S. Cl.
  CPC .............. *F25B 9/004* (2013.01); *B64D 13/06* (2013.01); *F25B 9/06* (2013.01); *B64D 2013/0603* (2013.01)

(58) Field of Classification Search
  CPC . F25B 9/004; F25B 9/06; B64D 13/06; B64D 2013/0603; B64D 2013/0648
  USPC .......................................................... 62/87
  See application file for complete search history.

(56) References Cited

U.S. PATENT DOCUMENTS

| 4,503,683 | A | 3/1985 | Wieland et al. |
| 4,967,565 | A | 11/1990 | Thomson et al. |
| 5,309,735 | A | 5/1994 | Maher, Jr. et al. |
| 5,461,882 | A | 10/1995 | Zywiak |
| 9,783,307 | B2 | 10/2017 | Bruno et al. |
| 10,160,546 | B2 | 12/2018 | Beers et al. |
| 2014/0199167 | A1 | 7/2014 | Beers et al. |
| 2016/0231031 | A1* | 8/2016 | Bruno ..................... F02C 7/141 |
| 2017/0167292 | A1 | 6/2017 | Army et al. |
| 2017/0167541 | A1* | 6/2017 | Army ..................... F01D 25/125 |
| 2021/0278108 | A1 | 9/2021 | Perez et al. |

FOREIGN PATENT DOCUMENTS

| EP | 0664856 B1 | 4/1996 |
| EP | 3539875 A1 | 9/2019 |

OTHER PUBLICATIONS

Extended European Search Report for International Application No. 21158493.3 dated Jul. 12, 2021, 35 pages.
European Search Report for Application No. 21160673.6, dated Jul. 28, 2021, 8 pages.

* cited by examiner

*Primary Examiner* — Steve S Tanenbaum
(74) *Attorney, Agent, or Firm* — Cantor Colburn LLP

(57) ABSTRACT

An air cycle machine includes a housing having an exterior wall and an interior wall, a scavenging turbine supported for rotation within the housing, and an ambient air fan. The ambient air fan is supported for rotation within the housing and is operably associated with the scavenging turbine. The interior wall defines therethrough a turbine-fan port that fluidly couples the ambient air fan to the scavenging turbine for communication of an overboard air flow to an ambient air flow without external ducting. Environmental control systems and methods of flowing fluid through air cycle machines are also described.

17 Claims, 4 Drawing Sheets

AIR CYCLE MACHINES AND METHODS OF COMMUNICATING FLUID THROUGH AIR CYCLE MACHINES

BACKGROUND

The present disclosure is generally related to environmental control, and more particularly to providing environmental control using air cycle machines.

Vehicles, such as aircraft, commonly employ environmental control systems having air cycle machines to provide conditioned air to environmentally controlled spaces on the aircraft, such as to passenger and crew compartments. The air cycle machines generally include a compressor, an expansion turbine, and heat exchangers to successively cool, compress, further cool, and expand air provided to the air cycle machine to generate a conditioned air flow. The conditioned air flow is provided to the environmentally controlled space(s) on the aircraft, the conditioned air typically driving an overboard air flow from the environmentally controlled space to maintain the atmosphere within the environmentally controlled space.

The overboard air flow is pressurized relative to the environment external to the vehicle. In such systems the air cycle machine can include a scavenging turbine to extract work from the overboard air flow prior to return of the overboard air flow to the environment external to the vehicle. The work extracted from the overboard air flow can be employed to power the compressor and/or to force ambient air across the heat exchangers, e.g., via an ambient air fan, improving efficiency of the air cycle machine. Routing the overboard air flow to and from the scavenging turbine is typically accomplished with external ducting, which must be assembled to the air cycle machine housing and which must be maintained over the service life of the air cycle machine.

Such systems and methods have generally been suitable for their intended purpose. However, there remains a need in the art for improved air cycle machines, environmental control systems, and methods flowing fluid through air cycle machines.

BRIEF DESCRIPTION

An air cycle machine is provided. The air cycle machine includes a housing having an exterior wall and an interior wall, a scavenging turbine supported for rotation within the housing, and an ambient air fan. The ambient air fan is supported for rotation within the housing and is operably associated with the scavenging turbine. The interior wall defines therethrough a turbine-fan port fluidly coupling the ambient air fan to the scavenging turbine.

In addition to one or more of the features described above, or as an alternative, further embodiments of the air cycle machine can include a one-way valve seated in the turbine-fan port and arranged to limit fluid communication between the ambient fan and the scavenging turbine.

In addition to one or more of the features described above, or as an alternative, further embodiments of the air cycle machine can include that the exterior wall defines therethrough a scavenging turbine inlet port, and that the scavenging turbine fluidly couples the scavenging turbine inlet port to the turbine-fan port.

In addition to one or more of the features described above, or as an alternative, further embodiments of the air cycle machine can include that the exterior wall defines a fan inlet port fluidly coupled to the ambient air fan, and that the turbine-fan port is arranged fluidly between the ambient air fan and the fan inlet port.

In addition to one or more of the features described above, or as an alternative, further embodiments of the air cycle machine can include that the exterior wall defines a fan outlet port, and that the turbine-fan port fluidly couples the fan outlet port to the scavenging turbine.

In addition to one or more of the features described above, or as an alternative, further embodiments of the air cycle machine can include that the ambient air fan is fixed in rotation relative to the scavenging turbine.

In addition to one or more of the features described above, or as an alternative, further embodiments of the air cycle machine can include a compressor arranged within the interior of the housing and fluidly coupled to the ambient air fan by the turbine-fan port.

In addition to one or more of the features described above, or as an alternative, further embodiments of the air cycle machine can include an expansion turbine arranged within the interior of the housing and fluidly coupled to the ambient air fan by the turbine-fan port.

In addition to one or more of the features described above, or as an alternative, further embodiments of the air cycle machine can include a shaft supported for rotation within the housing about a rotation axis, and that the scavenging turbine is fixed in rotation relative to the shaft, wherein the ambient air fan is fixed in rotation relative to the shaft.

In addition to one or more of the features described above, or as an alternative, further embodiments of the air cycle machine can include a compressor arranged within the interior of the housing and fluidly coupled to the ambient air fan by the turbine-fan port.

In addition to one or more of the features described above, or as an alternative, further embodiments of the air cycle machine can include an expansion turbine arranged within the interior of the housing and fluidly coupled to the ambient air fan by the turbine-fan port, and that the expansion turbine is fixed in rotation relative to the shaft.

In addition to one or more of the features described above, or as an alternative, further embodiments of the air cycle machine can include that the air cycle machine has no ducting external to the housing fluidly coupling the scavenging turbine to the ambient air fan.

In addition to one or more of the features described above, or as an alternative, further embodiments of the air cycle machine can include that the scavenging turbine is a radial flow turbine, and that the ambient air fan is an axial flow fan.

An environmental control system is also provided. The environmental control system includes an air cycle machine as described above. The housing defines a scavenging turbine chamber and a fan chamber separated from one another by the interior wall. The turbine-fan port fluidly couples the scavenging turbine chamber to the fan chamber. The exterior wall defines a scavenging turbine inlet port and the scavenging turbine fluidly couples the scavenging turbine inlet port to the turbine-fan port.

In addition to one or more of the features described above, or as an alternative, further embodiments of the environmental control system can include that the exterior wall defines a fan inlet port fluidly coupled to the ambient air fan, that the turbine-fan port is arranged fluidly between the ambient air fan and the fan inlet port, and that the air cycle machine has no external ducting fluidly coupling the scavenging turbine to the ambient air fan.

In addition to one or more of the features described above, or as an alternative, further embodiments of the environmental control system can include that the ambient air fan is fixed in rotation relative to the scavenging turbine, and that the air cycle machine further includes a compressor arranged within the interior of the housing and fluidly coupled to the ambient air fan by the turbine-fan port, wherein the compressor is fixed in rotation relative to the ambient air fan and the scavenging turbine; and an expansion turbine arranged within the interior of the housing and fluidly coupled to the ambient air fan by the turbine-fan port, wherein the expansion turbine is fixed in rotation relative to the ambient air fan and the scavenging turbine.

In addition to one or more of the features described above, or as an alternative, further embodiments of the environmental control system can include a shaft supported for rotation within the housing about a rotation axis, wherein the scavenging turbine is fixed in rotation relative to the shaft, wherein the ambient air fan is fixed in rotation relative to the shaft; a compressor arranged within the interior of the housing and fluidly coupled to the ambient air fan by the turbine-fan port, wherein the compressor is fixed in rotation relative to the shaft; and an expansion turbine arranged within the interior of the housing and fluidly coupled to the ambient air fan by the turbine-fan port, wherein the expansion turbine is fixed in rotation relative to the shaft.

In addition to one or more of the features described above, or as an alternative, further embodiments of the environmental control system can include a compressed air source fluidly coupled to the air cycle machine and an environmentally controlled space fluidly coupled by the air cycle machine to the compressed air source, and that the turbine-fan port fluidly couples the environmentally controlled space to the environment external to a vehicle carrying the environmental control system.

A method of flowing fluid through an air cycle machine includes, at an air cycle machine as described above, receiving an overboard air flow at the air cycle machine housing, receiving an ambient air flow at the air cycle machine housing, and intermixing the overboard air flow and the ambient air flow within the air cycle machine housing.

In addition to one or more of the features described above, or as an alternative, further embodiments of the method can include expanding the overboard air flow with the scavenging turbine; rotating the ambient air fan with the scavenging turbine; and driving, once intermixed, the overboard air flow and the ambient air flow from the housing with ambient air fan.

Technical effects of the present disclosure include air cycle machines with turbines that exhaust directly into the ambient air fan circuit of the air cycle machine and without external ducting fluidly coupling the turbine to ambient air fan circuit. In certain examples the present disclosure provides air cycle machines having relatively small rotative assembly length, allowing relatively higher speed operation and/or increased shaft system bending mode. In accordance with certain examples the present disclosure provides air cycle machines with relatively efficient turbine outlets and relatively small numbers of ducts and duct length. It is also contemplated that, in accordance with certain examples, air cycle machines described herein have relatively small size and/or which are lightweight.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
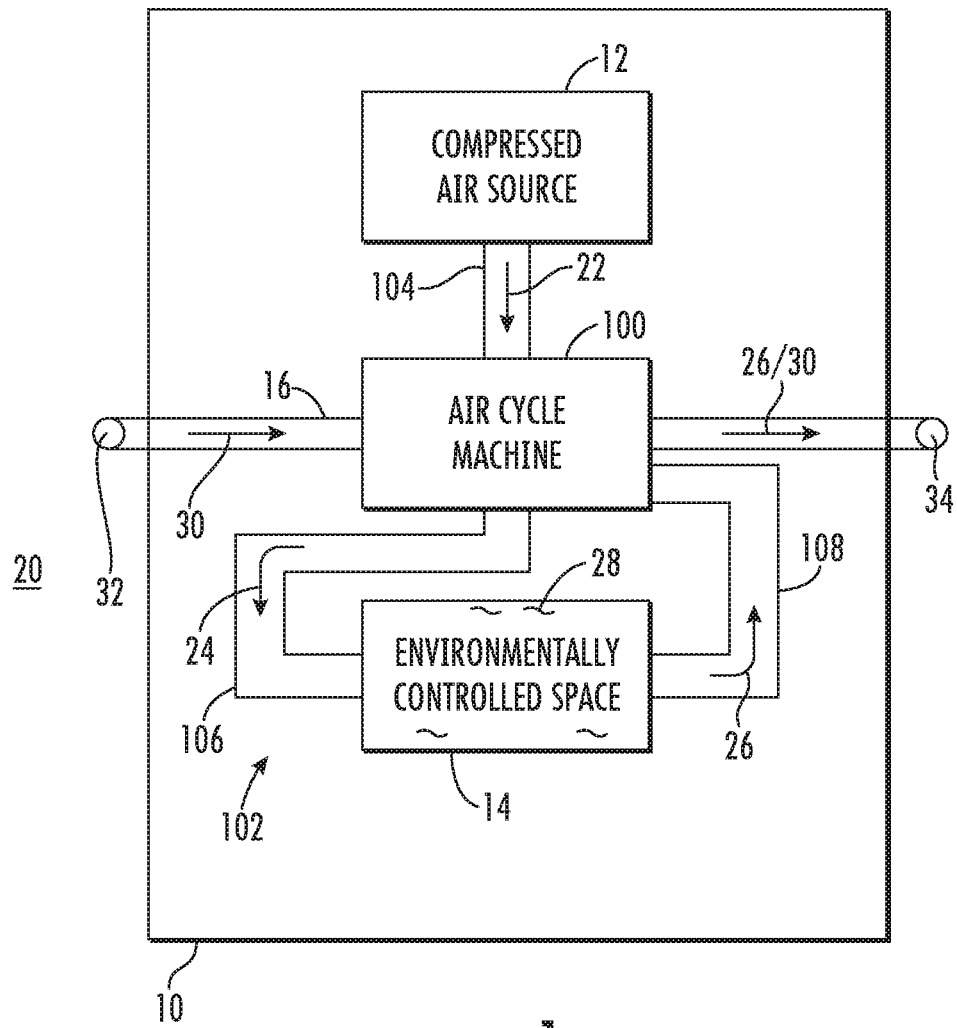
FIG. 1 is a schematic view of an environmental control system having an air cycle machine constructed in accordance with the present disclosure, showing the environmental control system providing a conditioned air flow to an environmentally controlled space on a vehicle.

Reference will now be made to the drawings wherein like reference numerals identify similar structural features or aspects of the subject disclosure. For purposes of explanation and illustration, and not limitation, a partial view of an example of an air cycle machine in accordance with the disclosure is shown in FIG. 1 and is designated generally by reference character 100. Other embodiments of air cycle machines, environmental control systems, and methods of conditioning air for environmental control systems using air cycle machines are provided in FIGS. 2-4, as will be described. The systems and methods described herein can be used for conditioning air for environmentally controlled spaces on aircraft, such as using bleed air from gas turbine engine compressors to supply conditioned air to environmentally controlled spaces on aircraft, though the present disclosure is not limited air cycle machines supplied with bleed air or to aircraft in general.

Referring to FIG. 1, a vehicle 10, e.g., an aircraft, is schematically shown. The vehicle 10 includes an environmental control system 102, a compressed air source 12, an environmentally controlled space 14, and an ambient air duct 16. The environmental control system 102 includes a compressed air duct 104, conditioned air duct 106, and an overboard air duct 108.

The compressed air duct 104 fluidly couples the compressed air source 12 to the air cycle machine 100. The air cycle machine 100 fluidly couples the compressed air duct 104 to the conditioned air duct 106 and is in fluid communication with the ambient air duct 16. The conditioned air duct 106 fluidly couples the air cycle machine 100 to the environmentally controlled space 14. The environmentally controlled space 14 fluidly couples the conditioned air duct 106 to the overboard air duct 108, the overboard air duct 108 in turn fluidly coupled to the ambient air duct 16 by the air cycle machine 100. As shown and described herein the compressed air source 12 is a compressor section of a gas turbine engine, e.g., an aircraft main engine or auxiliary power unit, and the environmentally controlled space 14 is a crew or a passenger cabin contained within an aircraft fuselage. This is for illustration purposes only and is non-limiting. As will be appreciated by those of skill in the art in view of the present disclosure, air cycle machines and environmental control systems employed in other applications can also benefit from the present disclosure, such as in terrestrial and marine applications.

During operation the compressed air source 12 communicates a compressed air flow 22, e.g., a bleed air flow, to the air cycle machine 100 via the compressed air duct 104. The air cycle machine 100 conditions the compressed air flow 22 to generate a conditioned air flow 24, which the air cycle machine 100 communicates to the environmentally controlled space 14 via the conditioned air duct 106. The conditioned air flow 24 enters the environmentally controlled space 14, mixes with a conditioned atmosphere 28 within the environmentally controlled space 14, and displaces an overboard air flow 26 through the overboard air duct 108.

The air cycle machine 100 scavenges power for operation of the air cycle machine 100 from the overboard air flow 26, e.g., according to differential in pressure between the interior of the environmentally controlled space 14 and the environment 20 external to the vehicle 10. More specifically, the air cycle machine 100 scavenges power from the overboard air flow 26 prior to communicating the overboard air flow 26 to the environment 20 external to the vehicle 10. Once scavenged, the cycle machine 100 communicates the overboard air flow 26 to the environment 20 external to the vehicle 10 through the ambient air flow 30 ingested from the environment 20 external to the vehicle 20.

Figure 2:
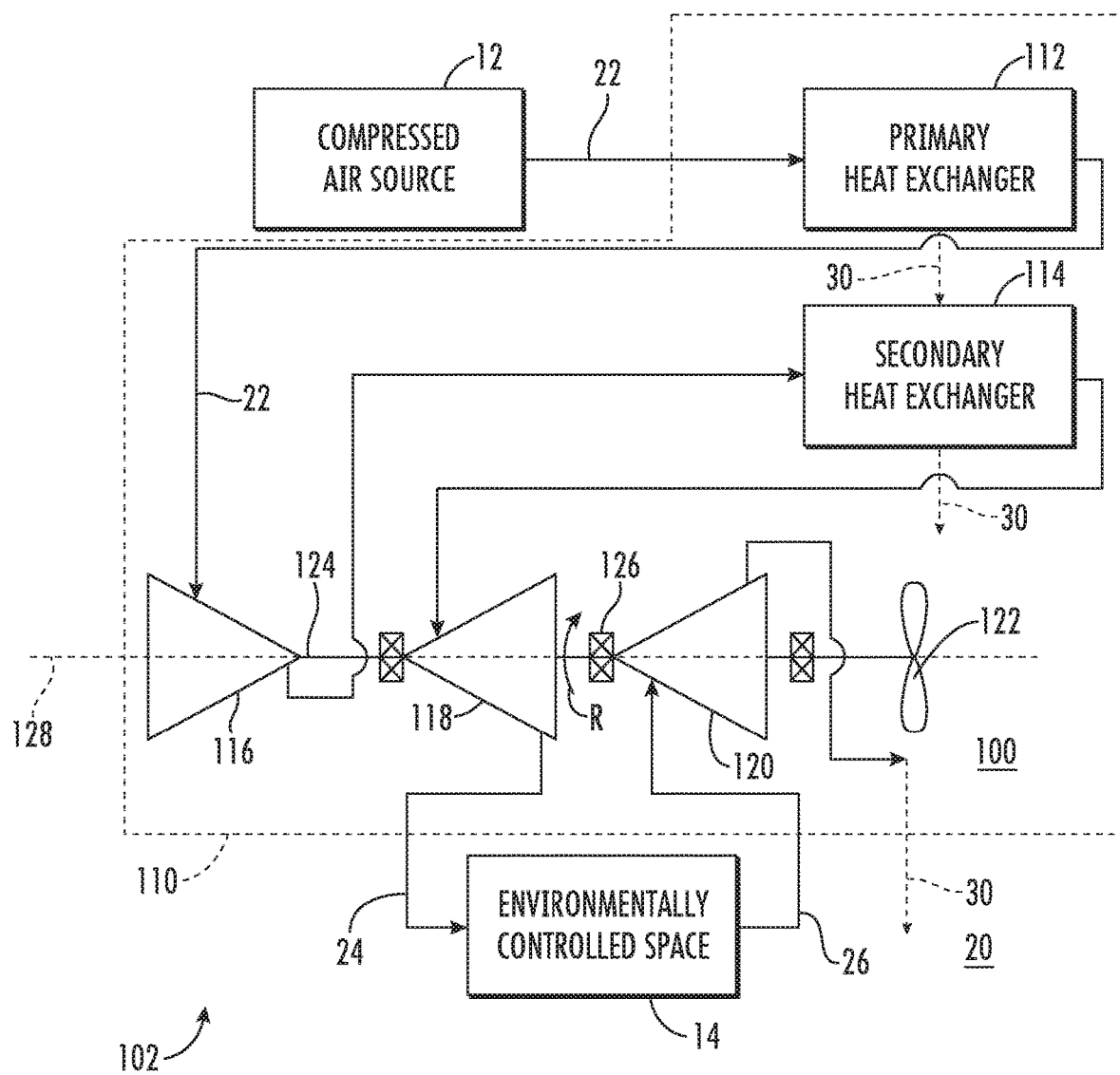
FIG. 2 is a schematic view of the environmental control system and air cycle machine of FIG. 1, showing a scavenging turbine communicating an overboard air flow received from the environmentally controlled space to an ambient air fan and therethrough the environment external to the vehicle.

With reference to FIG. 2, a portion of the environmental control system 102 including the air cycle machine 100 are schematically shown according to an example. As shown in FIG. 2 the air cycle machine 100 includes a housing 110, a primary heat exchanger 112, a secondary heat exchanger 114, and a compressor 116. The air cycle machine 100 also includes an expansion turbine 118, a scavenging turbine 120, and an ambient air fan 122. The air cycle machine 100 further includes a shaft 124 and a bearing arrangement 126.

The compressed air duct 104 (shown in FIG. 1) fluidly couples the compressed air source 12 (shown in FIG. 1) to the primary heat exchanger 112. The primary heat exchanger 112 fluidly couples the compressed air duct 104 to the compressor 116. The compressor 116 fluidly couples the primary heat exchanger 112 to the secondary heat exchanger 114. The secondary heat exchanger 114 fluidly couples the compressor 116 to the expansion turbine 118. The expansion turbine 118 fluidly couples the secondary heat exchanger 114 to the conditioned air duct 106 (shown in FIG. 1). The conditioned air duct 106 fluidly couples the expansion turbine 118 to the environmentally controlled space 14. The environmentally controlled space 14 fluidly couples the conditioned air duct 106 to overboard air duct 108 (shown in FIG. 1). The overboard air duct 108 fluidly couples the environmentally controlled space 14 to the scavenging turbine 120. The scavenging turbine 120 fluidly couples the overboard air duct 108 to the ambient air fan 122. The ambient air fan 122 in turn fluidly couples the scavenging turbine 120 to the ambient air duct 16 (shown in FIG. 1), and therethrough to the environment 20 external to the vehicle 10 (shown in FIG. 1).

With continuing reference to FIG. 1, the ambient air duct 16 has an ambient air duct inlet 32, an ambient air duct outlet 34, and fluidly couples the ambient air duct inlet 32 to the ambient air duct outlet 34. As shown in FIG. 2, the primary heat exchanger 112, the secondary heat exchanger 114, and the ambient air fan 122 are arranged serially along the ambient air duct 16 along the direction of fluid flow through the ambient air duct 16 between the ambient air duct inlet 32 and the ambient air duct outlet 34. In this respect the primary heat exchanger 112 is fluidly coupled to the ambient air duct inlet 32 and the secondary heat exchanger 114 is fluidly coupled the primary heat exchanger 112. In further respect the ambient air fan 122 is fluidly coupled to the secondary heat exchanger 114 and the ambient air duct outlet 34 is fluidly coupled to the ambient air fan 122.

During operation the compressed air source 12 (shown in FIG. 1) communicates the compressed air flow 22 to the compressed air duct 104 (shown in FIG. 1). The compressed air duct 104 communicates the compressed air flow 22 to the compressor 116 through primary heat exchanger 112, which in turn transfers heat from the compressed air flow 22 to the ambient air flow 30 traversing the ambient air duct 16 (shown in FIG. 1).

The compressor 116 compresses the compressed air flow 22 subsequent to cooling in the primary heat exchanger 112 and communicates the compressed air flow to the secondary heat exchanger 114. The secondary heat exchanger 114 transfers additional heat from the compressed air flow 22 to the ambient air flow 30 traversing the ambient air duct 16 (shown in FIG. 1). Once further cooled, the secondary heat exchanger 114 communicates the compressed air flow 22 subsequent to this additional cooling to the expansion turbine 118.

The expansion turbine 118 expands the compressed air flow 22, cooling and extracting work from the compressed air flow 22 as the compressed air flow 22 traverses the expansion turbine 118. The expansion turbine 118 communicates the extracted work to the compressor 116 through the shaft 124. The expansion turbine 118 also communicates compressed air flow 22 once expanded and further cooled to the environmentally controlled space 14 via the conditioned air duct 106 (shown in FIG. 1) as the conditioned air flow 24.

Introduction of the conditioned air flow 24 into the environmentally controlled space 14 generates the overboard air flow 26 by displacing from conditioned atmosphere 28 (shown in FIG. 1) the overboard air flow 26. The overboard air flow 26 is communicated from the environmentally controlled space 14 by the overboard air duct 108 to the scavenging turbine 120, which in turn scavenges work from the overboard air flow 26 according to pressure differential between the environmentally controlled space 14 and the environment 20 external to the vehicle 10 (shown in FIG. 1). The scavenging turbine 120 applies scavenged work from the overboard air flow 26 to the ambient air fan 122 via the shaft 124, rotating the ambient air fan 122 and thereby driving the ambient air flow 30 through the ambient air duct 16 (shown in FIG. 1).

Once scavenged, i.e., expanded, the scavenging turbine 120 communicates the overboard air flow 26 to the ambient air duct 16 through the ambient air fan 122. It is contemplated that scavenging turbine 120 communicate the overboard air flow 26 to the ambient air duct 16 internally, i.e., within the housing 110, without external ducting. In this respect the air cycle machine 100 has no external ducting fluidly coupling the scavenging turbine 120 to the ambient air fan 122 to communicate the overboard air flow 26 to the ambient air duct 16, simplifying the arrangement of the air cycle machine 100.

The compressor 116 is operatively associated with the expansion turbine 118. Operative association of the compressor 116 with the expansion turbine 118 is via the shaft 124, which connects the expansion turbine 118 to the compressor 116 such that the compressor 116 is fixed in rotation relative to the expansion turbine 118, and communicates the work extracted by the expansion turbine 118 to the compressor 116 as mechanical rotation R. It is contemplated that the compressor 116 and the expansion turbine 118 be supported for rotation within the housing 110 by a bearing arrangement 126. In the illustrated example the ambient air fan 122 is operatively associated with the scavenging turbine 120, operative association of the ambient air fan 122 with the scavenging turbine 120 also accomplished by the shaft 124—the scavenging turbine 120 and the ambient air fan 122 support for rotation by the bearing arrangement 126 about a rotation axis 128.

Figure 3:
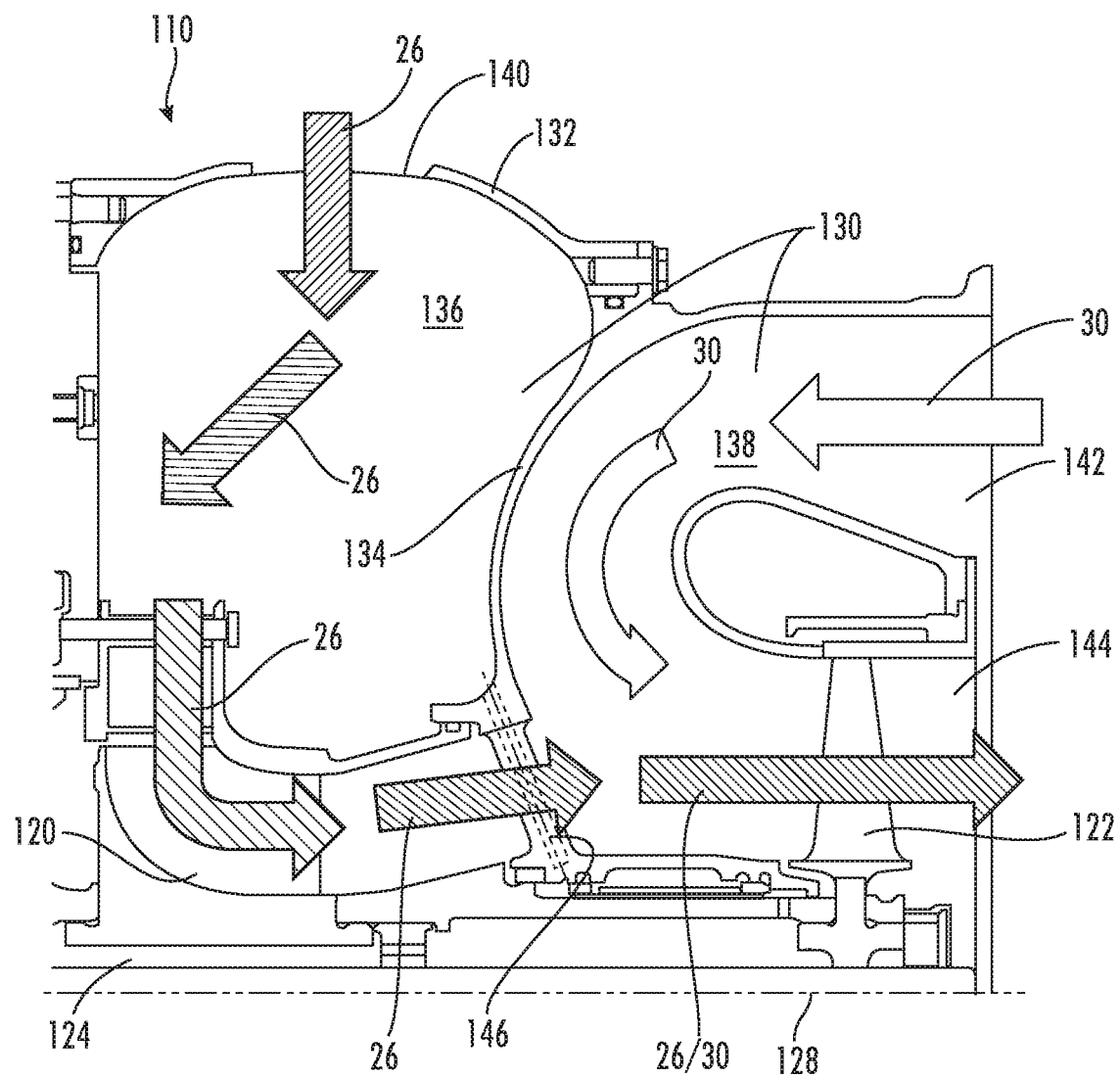
FIG. 3 is a cross-sectional view of a portion of the air cycle machine of FIG. 1 including the scavenging turbine and the ambient air fan, showing a turbine-ambient air fan port defined within a housing enclosing the scavenging turbine and ambient air fan communicating the overboard air flow to the ambient air fan.

With reference to FIG. 3, a portion of the air cycle machine 100 including the scavenging turbine 120 and the ambient air fan 122 is shown. The housing 110 has an interior 130 with an exterior wall 132 and an interior wall 134. The interior wall 134 divides the interior 130 of the housing 110 into a scavenging turbine chamber 136 and a fan chamber 138. The exterior wall 132 defines a scavenging turbine inlet port 140, a fan inlet port 142, and a fan outlet port 144.

The scavenging turbine 120 is supported for rotation within the scavenging turbine chamber 136 for rotation about the rotation axis 128. The ambient air fan 122 is support for rotation within the fan chamber 138 about the rotation axis 128. The shaft 124 extends between the scavenging turbine 120 and the ambient air fan 122, connects the ambient air fan 122 to the scavenging turbine 120, and axially spans the scavenging turbine chamber 136 and the fan chamber 138 to operably associated the ambient air fan 122 with the scavenging turbine 120.

The scavenging turbine inlet port 140 fluidly couples the scavenging turbine 120 to the overboard air duct 108 (shown in FIG. 1). The fan inlet port 142 and the fan outlet port 144 fluidly couple the ambient air duct 16 (shown in FIG. 1) to the ambient air fan 122 and in this respect the fan chamber 138 forms portion of the ambient air duct 16. It is contemplated that the fan inlet port 142 be fluidly downstream of the secondary heat exchanger 114 (shown in FIG. 2), that the fan outlet port 144 fluidly couple the environment 20 external to the vehicle 10 (shown in FIG. 1) to the ambient air fan 122, and that the ambient air fan 122 fluidly couple the secondary heat exchanger 114 to the environment 20 external to the vehicle 10 through the fan inlet port 142 and the fan outlet port 144.

The interior wall 134 defines therethrough a turbine-fan port 146. The turbine-fan port 146 fluidly couples the scavenging turbine chamber 136 to the fan chamber 138. More specifically, the turbine-fan port 146 fluidly couples the scavenging turbine 120 to the ambient air fan 122 such that the overboard air flow 26, once expanded by the scavenging turbine 120, flows the ambient air duct 16 through the ambient air fan 122 through the interior 130 of the housing 110. In certain examples the scavenging turbine 120 is a radial flow turbine, which provides an axially compact arrangement to the air cycle machine 100. In accordance with certain examples the ambient air fan 122 is an axial flow fan, also providing an axially compact arrangement to the air cycle machine 100. It is also contemplated that, in accordance with certain examples, that a one-way valve 148 seated within the turbine-fan port 146 to prevent backflow from the fan chamber 138 to the turbine scavenging turbine chamber 136.

During operation the overboard air flow 26 enters the housing 110 through the scavenging turbine inlet port 140 and is communicated to the scavenging turbine 120 through the scavenging turbine chamber 136. The scavenging turbine 120 expands the overboard air flow 26, extracts work from the overboard air flow 26 as the overboard air flow 26 expands, and thereafter communicates the overboard air flow 26 to the fan chamber 138. The extracted work is applied to the ambient air fan 122 by the shaft 124, which rotatably drives the ambient air fan 122 within the fan chamber 138.

The ambient air flow 30 enters the housing 110 through the fan inlet port 142. The fan inlet port 142 communicates the ambient air flow 30 to the fan chamber 138, wherein the ambient air flow 30 intermixes with the overboard air flow 26. Once intermixed, the fan chamber 138 communicates the ambient air flow 30 and the overboard air flow 26 to the ambient air fan 122, which forces the intermixed flow of the overboard air flow 26 and the ambient air flow 30 through the fan outlet port 144. The fan outlet port 144 communicates the overboard air flow 26 and the ambient air flow 30 to the ambient air duct outlet 34, through which the overboard air flow 26 and the ambient air flow 30 issue to the environment 20 external to the vehicle 10.

Figure 4:
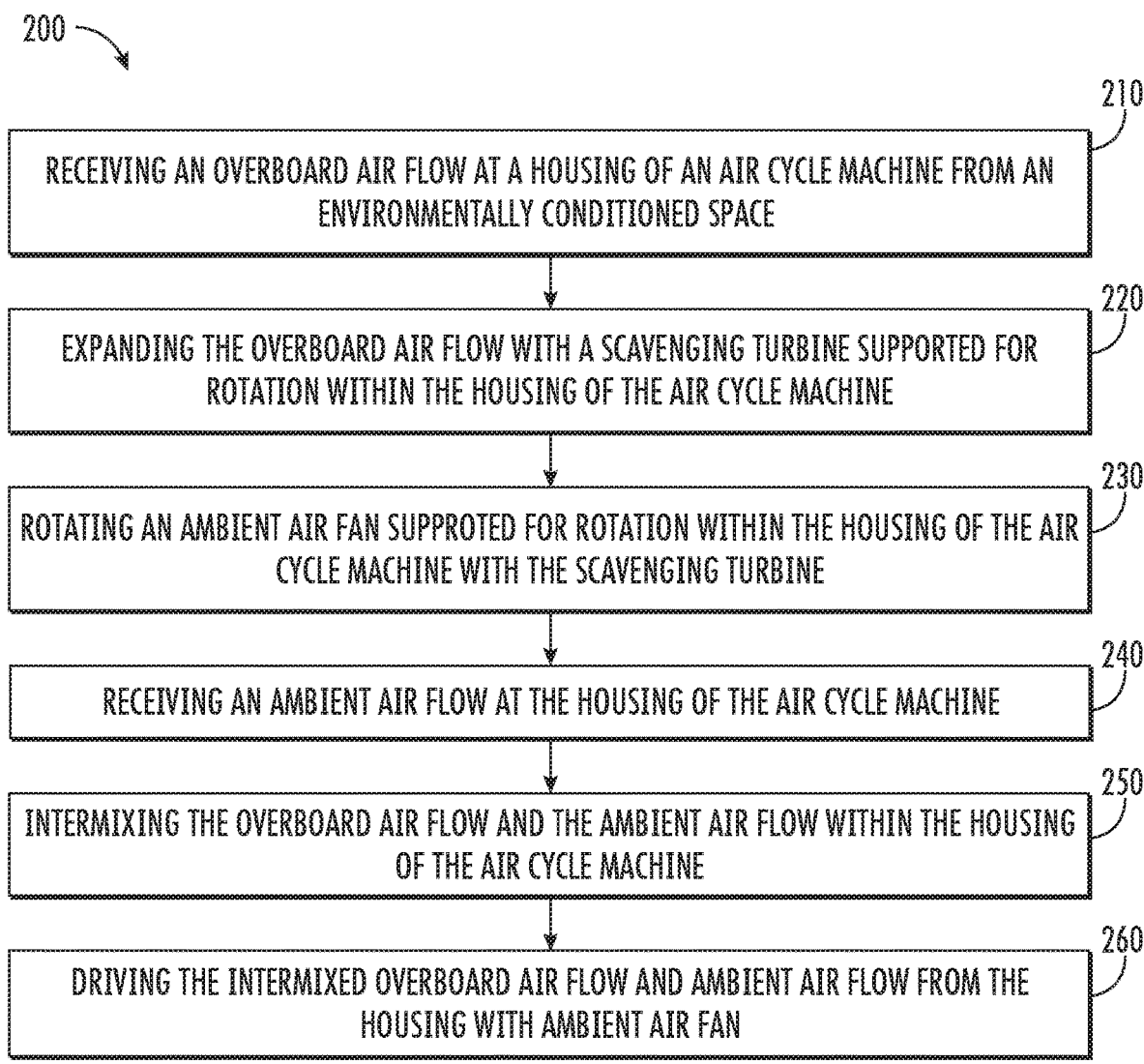
FIG. 4 is block diagram of a method of flowing fluid through an air cycle machine, showing operations of the method according to an illustrative and non-limiting example of the method.

With reference to FIG. 4, a method 200 of flowing fluid through an air cycle machine, e.g., the air cycle machine 100, is shown. The method 200 includes receiving an overboard air flow at a housing of the air cycle machine, e.g., the housing 110 (shown in FIG. 1), as shown with box 210. As shown with box 240, the method 200 also includes receiving an ambient air flow at the housing, e.g., the ambient air flow 30 (shown in FIG. 1). It is contemplated that the overboard air flow be received from an environmentally controlled space, e.g., the environmentally controlled space 14 (shown in FIG. 1), as also shown with box 210.

As shown with box 220, the overboard air flow is expanded with a scavenging turbine supported for rotation within the housing, e.g., the scavenging turbine 120 (shown in FIG. 2). An ambient air fan supported for rotation within the housing is rotated by the scavenging turbine, e.g., the ambient air fan 122 (shown in FIG. 2), using work extracted by the scavenging turbine from the overboard air flow, as shown with box 230. The expanded overboard air flow is intermixed with the ambient air flow within the housing of the air cycle machine, as shown with box 250, the intermixed ambient air flow and overboard air flow driven from the housing by the rotation of the ambient air fan, as shown with box 260.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An air cycle machine, comprising:
a housing having an exterior wall and an interior wall wherein the exterior wall defines a fan chamber having a fan inlet port and a fan outlet port;
a scavenging turbine supported for rotation within the housing, the savaging turbine having a turbine inlet and a turbine outlet; and
an ambient air fan supported for rotation within the fan chamber and that moves air from the fan inlet port to the fan outlet port and operably associated with the scavenging turbine, wherein the interior wall defines therethrough a turbine-fan port fluidly coupling the ambient air fan to the outlet of scavenging turbine so that air exiting the turbine outlet mixes with air in the fan chamber and exits the air cycle machine through the fan outlet port.

2. The air cycle machine of claim 1, wherein the exterior wall defines therethrough a scavenging turbine inlet port, wherein the scavenging turbine fluidly couples the scavenging turbine inlet port to the turbine-fan port.

3. The air cycle machine of claim 1, wherein the turbine-fan port is arranged fluidly between the ambient air fan and the fan inlet port.

4. The air cycle machine of claim 1, further comprising an air bearing or a foil bearing supporting the scavenging turbine and the ambient air fan for rotation about a rotation axis.

5. The air cycle machine of claim 1, wherein the air cycle machine has no ducting external to the housing fluidly coupling the scavenging turbine to the ambient air fan.

6. The air cycle machine of claim 1, wherein the scavenging turbine is a radial flow turbine, wherein the ambient air fan is an axial flow fan.

7. The air cycle machine of claim 1, wherein the ambient air fan is fixed in rotation relative to the scavenging turbine.

8. The air cycle machine of claim 7, further comprising a compressor arranged within the interior of the housing and fluidly coupled to the ambient air fan by the turbine-fan port.

9. The air cycle machine of claim 7, further comprising an expansion turbine arranged within the interior of the housing and fluidly coupled to the ambient air fan by the turbine-fan port.

10. The air cycle machine of claim 1, further comprising a shaft supported for rotation within the housing about a rotation axis, wherein the scavenging turbine is fixed in rotation relative to the shaft, wherein the ambient air fan is fixed in rotation relative to the shaft.

11. The air cycle machine of claim 10, further comprising a compressor arranged within the interior of the housing and fluidly coupled to the ambient air fan by the turbine-fan port.

12. The air cycle machine of claim 10, further comprising an expansion turbine arranged within the interior of the housing and fluidly coupled to the ambient air fan by the turbine-fan port, wherein the expansion turbine is fixed in rotation relative to the shaft.

13. An environmental control system, comprising:
an air cycle machine as recited in claim 1, wherein the housing defines therein a scavenging turbine chamber and a fan chamber separated from one another by the interior wall, the turbine-fan port fluidly coupling the scavenging turbine chamber to the fan chamber; and
wherein the exterior wall defines therethrough a scavenging turbine inlet port, wherein the scavenging turbine fluidly couples the scavenging turbine inlet port to the turbine-fan port.

14. The environmental control system of claim 13, wherein the exterior wall defines a fan inlet port fluidly coupled to the ambient air fan, wherein the turbine-fan port is arranged fluidly between the ambient air fan and the fan inlet port; and
wherein the air cycle machine has no external ducting fluidly coupling the scavenging turbine to the ambient air fan.

15. The environmental control system of claim 13, wherein the ambient air fan is fixed in rotation relative to the scavenging turbine, the air cycle machine further comprising:
a compressor arranged within the interior of the housing and fluidly coupled to the ambient air fan by the turbine-fan port, wherein the compressor is fixed in rotation relative to the ambient air fan and the scavenging turbine; and
an expansion turbine arranged within the interior of the housing and fluidly coupled to the ambient air fan by the turbine-fan port, wherein the expansion turbine is fixed in rotation relative to the ambient air fan and the scavenging turbine.

16. The environmental control system of claim 13, further comprising:
a shaft supported for rotation within the housing about a rotation axis, wherein the scavenging turbine is fixed in rotation relative to the shaft, wherein the ambient air fan is fixed in rotation relative to the shaft;
a compressor arranged within the interior of the housing and fluidly coupled to the ambient air fan by the turbine-fan port, wherein the compressor is fixed in rotation relative to the shaft; and
an expansion turbine arranged within the interior of the housing and fluidly coupled to the ambient air fan by the turbine-fan port, wherein the expansion turbine is fixed in rotation relative to the shaft.

17. The environmental control system of claim 13, further comprising:
a compressed air source fluidly coupled to the air cycle machine; and
an environmentally controlled space fluidly coupled by the air cycle machine to the compressed air source, wherein the turbine-fan port fluidly couples the environmentally controlled space to the environment external to a vehicle carrying the environmental control system.

* * * * *